(12) United States Patent
Stanek

(10) Patent No.: US 7,626,286 B2
(45) Date of Patent: Dec. 1, 2009

(54) METHOD FOR MAINS-SYNCHRONOUS SWITCHING OF CIRCUIT BREAKERS, AND AN APPARATUS FOR CARRYING OUT THIS METHOD

(75) Inventor: Michael Stanek, Gebenstorf (CH)

(73) Assignee: ABB Technology AG, Zurich (CH)

( * ) Notice: Subject to any disclaimer, the term of this patent is extended or adjusted under 35 U.S.C. 154(b) by 552 days.

(21) Appl. No.: 10/394,273

(22) Filed: Mar. 24, 2003

(65) Prior Publication Data

US 2003/0189378 A1 Oct. 9, 2003

(30) Foreign Application Priority Data

Apr. 5, 2002 (EP) .................................. 02405271

(51) Int. Cl.
*H01H 83/00* (2006.01)
*H02H 3/00* (2006.01)
*H02H 7/00* (2006.01)

(52) U.S. Cl. ........................... 307/130; 307/131; 361/1; 361/2; 361/3; 361/5; 361/6; 361/7

(58) Field of Classification Search ................ 307/130, 307/131; 361/1, 2, 3, 5, 6, 7
See application file for complete search history.

(56) References Cited

U.S. PATENT DOCUMENTS

| 5,563,459 A | 10/1996 | Kurosawa et al. | |
|---|---|---|---|
| 6,282,499 B1 * | 8/2001 | Andersen | 702/64 |
| 6,845,020 B2 * | 1/2005 | Deng et al. | 363/37 |
| 2003/0015977 A1 * | 1/2003 | Lee et al. | 318/114 |

FOREIGN PATENT DOCUMENTS

DE 1565995 6/1970

* cited by examiner

*Primary Examiner*—Fritz M Fleming
*Assistant Examiner*—Dru M Parries
(74) *Attorney, Agent, or Firm*—Buchanan Ingersoll & Rooney PC

(57) ABSTRACT

The method for mains-synchronous switching of circuit breakers comprises the following method steps: measurement of the current flowing through a circuit breaker (9) and measurement of a mains voltage on a first side of the circuit breaker (9), additional voltage measurement on a second side of the circuit breaker (9), feeding of all the measurement signals to a control device (18), deciding in the control device (18), on the basis of the characteristic data stored there, which measurement signal will be used as the reference value for the mains-synchronous tripping of the circuit breaker (9), generating a switching command, which initiates the mains-synchronous switching of the circuit breaker (9) on the basis of this decision, and carrying out the switching command by the circuit breaker (9).

27 Claims, 1 Drawing Sheet

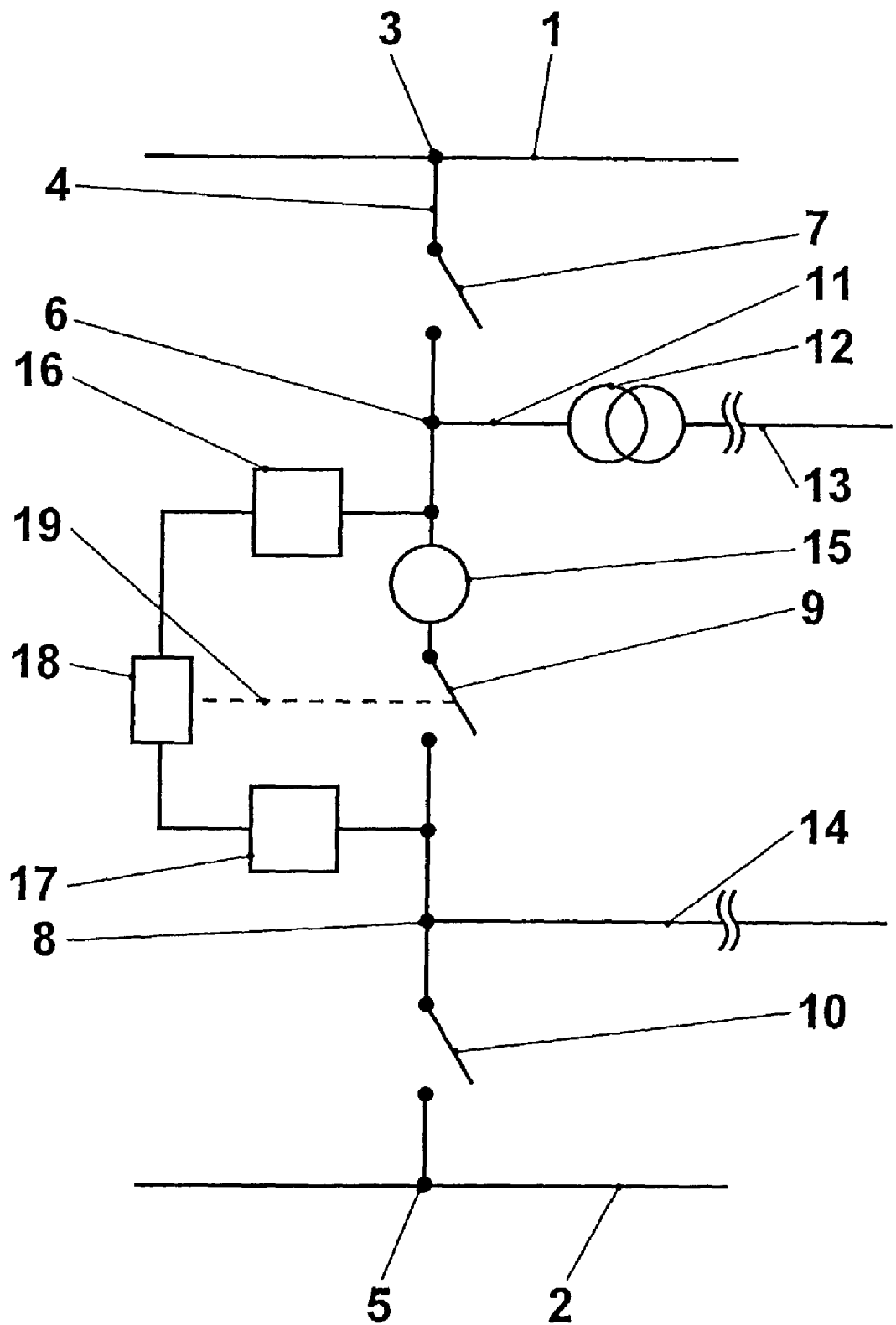

METHOD FOR MAINS-SYNCHRONOUS SWITCHING OF CIRCUIT BREAKERS, AND AN APPARATUS FOR CARRYING OUT THIS METHOD

This application claims priority under 35 U.S.C. §§ 119 and/or 365 to Appln. No. 02405271.4 filed in Europe on Apr. 5, 2002; the entire content of which is hereby incorporated by reference.

FIELD OF THE INVENTION

The invention is based on a method for mains-synchronous switching of circuit breakers as claimed in the precharacterizing clause of claim 1, and an apparatus for carrying out this method as claimed in the precharacterizing clause of claim 3.

BACKGROUND OF THE INVENTION

It is known that circuit breakers in power distribution networks can be operated on connection and disconnection such that the load on the respective circuit breaker is as low as possible, especially also with regard to contact erosion and to the generation of overvoltages or overcurrents as a result of the respective switching operation.

Laid-open Specification DE 1 565 995 discloses a device which allows mains-synchronous tripping of an AC circuit breaker. A current measurement and a voltage measurement are provided in this device, and generate the two measurement signals which are fed to the actual control device for synchronization. This measurement is normally carried out on the mains side of the circuit breaker, since the mains voltage is always present on this side and is used as a reference value for mains-synchronous switching. No voltage measurement is provided on the load side of the circuit breaker, since, when the load is disconnected, there is no voltage on this side which could be used as a reference value for mains-synchronous switching.

However, switchgear assembly configurations exist in which the load flow direction is not clearly defined by the circuit breaker. In switchgear assemblies such as these, mains-synchronous switching is not possible in all operating situations by means of the described device.

SUMMARY OF THE INVENTION

The invention as it is characterized in the independent claims achieves the object of specifying a method which allows mains-synchronous switching of circuit breakers irrespective of the load flow direction, and of specifying an apparatus for carrying out this method.

The method for mains-synchronous switching of circuit breakers comprises the following method steps:
  the current flowing through the circuit breaker is measured and, in addition, a mains voltage is measured on a first side of the circuit breaker,
  a voltage measurement is additionally carried out on a second side of the circuit breaker,
  all the measurement signals are fed to a control device,
  characteristic data which is stored in the control device for all possible switching situations is used by the control device to decide which measurement signal is used as the reference value for the mains-synchronous tripping of the circuit breaker,
  a switching command, which initiates the mains-synchronous switching of the circuit breaker, is generated in the control device on the basis of this decision, and
  in that the circuit breaker carries out the switching command.

The control device detects all possible switching situations and initiates the mains-synchronous switching of the circuit breaker associated with the respective switching situation.

The apparatus for carrying out the method for mains-synchronous switching of circuit breakers is provided with a current transformer and with a voltage transformer on a first side of a circuit breaker. Furthermore, a further voltage transformer is provided on a second side of the circuit breaker. Connections to a control device exist for the measurement signals from the current transformer and from the two voltage transformers. The control device has a memory with data which is characteristic of all possible switching situations, which data is used to decide which measurement signal can be used as the reference value for the mains-synchronous tripping of the circuit breaker. The control device has means which can generate a switching command which initiates the mains-synchronous switching of the circuit breaker.

The invention, its development and the advantages which can be achieved with it will be explained in more detail in the following text with reference to the drawing, which illustrates only one possible embodiment.

BRIEF DESCRIPTION OF THE DRAWING

The single FIGURE shows a part of a switchgear assembly for a power distribution network, only one phase of which is illustrated for the sake of simplicity.

Only those elements which are required for direct understanding of the invention are illustrated and described.

DETAILED DESCRIPTION OF THE INVENTION

FIG. 1 shows a part of a switchgear assembly, only one phase of which is illustrated for the sake of simplicity, and which in turn can be regarded as part of a power distribution network, which will not be described in any more detail. This switchgear assembly has, for example, two busbars 1 and 2. A line 4 which is connected to a terminal 5 of the busbar 2 branches off from a terminal 3 of the busbar 1. A circuit breaker 7, which can interrupt the line 4, is arranged between the terminal 3 and a terminal 6, which is likewise connected to the line 4. A second circuit breaker 9, which can interrupt the line 4, is arranged between the terminal 6 and a terminal 8, which is likewise connected to the line 4. A third circuit breaker 10, which can interrupt the line 4, is arranged between the terminal 8 and the terminal 5.

A connecting line 11 branches off from the terminal 6 and connects the terminal 6 to a transformer 12. The transformer 12 has an outgoing line 13. This connecting line 11 can be used for feeding power or can carry electrical power away via the line 13 to a power supply unit where power is currently required, depending on the operating state of the power distribution network. A line 14 likewise branches off from the terminal 8 and can supply or carry away electrical power depending on the operating state of the power distribution network. The power flows through the line 4 are accordingly dependent on the respective operating state of the power distribution network, but they can change direction comparatively quickly.

A current transformer 15 is provided in the connection between the terminal 6 and the circuit breaker 9. Furthermore, a voltage transformer 16 is connected in this area connected to the terminal 6. A further voltage transformer 17 is connected in the area between the terminal 8 and the circuit breaker 9. The two voltage transformers 16 and 17 are connected to a control device 18, which further processes their measurement signals. The measurement signals received from the current transformer 15 are likewise processed further in the control device 18. The control device 18 compares the received measurement signals with data that is already stored.

The control device 18 is associated with the circuit breaker 9. The data stored in it includes the characteristics of all the operating situations and fault situations which are possible at this location, and define them uniquely. Furthermore, it contains an algorithm using which appropriate mains-synchronous tripping of the circuit breaker 9 is ensured for each specific switching situation. In addition, data relating to the present operating state of the circuit breaker 9, for example changes in its own timing that are dependent on operation, erosion-dependent changes to the contact separation and the like, can also be detected by sensors and can be taken into account in an appropriate manner by the control device 18. Together with the control device 18 associated with it, the circuit breaker 9 is suitable for mains-synchronous switching. Since voltage measurements are provided in this case on both sides of the circuit breaker 9, the control device 18 can always clearly determine, by means of comparisons with the data stored in it and in every possible fault situation as well, which side of the circuit breaker 9 can be used as the reference base for the mains-synchronous switching. In particular, mains-synchronous switching of the circuit breaker 9 is ensured even during normal operation, irrespective of the low flow direction through the circuit breaker 9.

A dashed line of action 19 indicates that the control device 18 operates the circuit breaker 9 when one of the predetermined tripping criteria is satisfied. The circuit breaker 9 is then always tripped such that it switches in synchronism with the mains.

FIG. 1 will be considered in more detail in order to explain the method of operation. When the circuit breaker 9 is disconnected and is intended to be connected, then the two voltage transformers 16 and 17 supply measurement signals which correspond to the voltages that are present on the respective side. When the voltage on both sides is the same, then the control device 18 identifies this, and connection is carried out with no problems. However, if there is no voltage on one side of the circuit breaker 9, that is to say this side of the network is switched off, then the control device 18 chooses the other side, where the voltage is present, as the reference value for mains-synchronous connection. The circuit breaker 9 is then initiated by the control device 18 such that contact is made in such a way that no switching-on overvoltages or only small switching-on overvoltages, or inrush overcurrents, can occur. In this case, the mains insulation is not loaded with the rated voltage, so that the dielectric operational reliability of the mains is advantageously improved. The voltage measurement on both sides of the circuit breaker 9 and the comparison of the measurement values also prevent the possibility of connecting two power supply units which are being operated asynchronously as a result of a defect. Such incorrect switching could cause major consequential damage. If capacitive loads are intended to be connected, then the circuit breaker 9 is initiated such that high inrush currents are avoided.

In the event of short-circuit disconnections, the circuit breaker 9 is tripped so as to achieve an arcing time in it that is as short as possible, thus keeping its contact erosion low, which results in an advantageous increase in the life of the contacts. When lines on which there is no load are being disconnected, this switching situation is likewise detected by the control device 18 and the circuit breaker 9 is tripped such that no premature disconnection of small inductive currents occurs. Apart from this, when the control device 18 is being used to correctly disconnect lines or small inductive loads, a longer arcing time is set in order to ensure that there is as much distance as possible between the contacts in the circuit breaker 9 when the arc is quenched. This comparatively large contact separation means that a comparatively high level of resistance to restriking in the circuit breaker 9 is achieved, so that no overvoltages stimulated by restrikes can occur in the power distribution network. This advantageously places less load on the insulation of the mains.

LIST OF REFERENCE SYMBOLS

1, 2 Busbar
3 Terminal
4 Line
5,6 Terminal
7 Circuit breaker
8 Terminal
9,10 Circuit breaker
11 Connecting line
12 Transformer
13,14 Line
15 Current transformer
16,17 Voltage transformers
18 Control device
19 Dashed line of action

The invention claimed is:

1. An apparatus for mains-synchronous connecting of a disconnected circuit breaker irrespective of a load flow direction, having a current transformer and having a voltage transformer on a first side of a circuit breaker,
   wherein a further voltage transformer is provided on a second side of the circuit breaker,
   wherein the circuit breaker is comprised in a switchgear assembly, which is configured such that the load flow direction is not defined by the circuit breaker,
   wherein connections to a control device exist for reception of measurement signals from the current transformer and from the two voltage transformers,
   wherein the control device has means for processing and comparing the voltage measurements on both sides of the circuit breaker,
   wherein the control device has a memory with data which is characteristic of all possible switching situations, which data is used to decide which voltage measurement signal is used as a reference value for the mains-synchronous tripping of the circuit breaker, and
   wherein the control device has means for generating a switching command which initiates the mains-synchronous switching of the circuit breaker such that a timing characteristic of its tripping is controllably varied based on a detected switching situation for improved mains-synchronous switching.

2. The apparatus according to claim 1, comprising sensors to detect alterations to the present operating state of the circuit breaker that affect the timing of the circuit breaker and are dependent on operation or erosion-dependent changes to a contact separation, the sensors relaying data relating to the present operating state of the circuit breaker to the control device.

3. The apparatus according to claim 1, wherein mains-synchronous switching of the circuit breaker is ensured even during normal operation for either flow direction through the circuit breaker.

4. The apparatus as claimed in claim 1, wherein the power that flows through the line, which is interruptible by the circuit breaker, is dependent on the operating state of the power distribution network and can change direction quickly.

5. The apparatus as claimed in claim 4, wherein, when the voltage on both sides is the same, the control device identifies this and connection is carried out.

6. The apparatus as claimed in claim 4, wherein, when there is no voltage on one side of the circuit breaker, the control device chooses the other side, where the voltage is present, as the reference value for mains-synchronous connection.

7. The apparatus as claimed in claim 4, wherein the circuit breaker is initiated by the control device such that contact is made in such a way that no switching-on overvoltages, or only small switching-on overvoltages or inrush overcurrents, occur.

8. The apparatus as claimed in claim 1, wherein, when the voltage on both sides is the same, the control device identifies this and connection is carried out.

9. The apparatus as claimed in claim 1, wherein, when there is no voltage on one side of the circuit breaker, the control device chooses the other side, where the voltage is present, as the reference value for mains-synchronous connection.

10. The apparatus as claimed in claim 1, wherein the circuit breaker is initiated by the control device such that contact is made in such a way that no switching-on overvoltages, or only small switching-on overvoltages or inrush overcurrents, occur.

11. A method for mains-synchronous connecting of a disconnected circuit breaker irrespective of a load flow direction, in which a voltage on a first side of the circuit breaker is measured to produce a voltage measurement signal,
   wherein a voltage measurement is additionally carried out on a second side of the circuit breaker to produce another voltage measurement signal,
   wherein the circuit breaker is comprised in a switchgear assembly, which is configured such that the load flow direction is not defined by the circuit breaker,
   wherein the two voltage measurement signals are fed to a control device, and the voltage measurements on both sides of the circuit breaker are compared with one another,
   wherein characteristic data which is stored in the control device for all possible switching situations is used by the control device to decide which voltage measurement signal is used as the reference value for the mains-synchronous tripping of the circuit breaker,
   wherein a switching command, which initiates the mains-synchronous switching of the circuit breaker, is generated in the control device on the basis of this decision, and
   wherein the circuit breaker carries out the switching command such that a timing characteristic of its tripping is controllably varied based on a detected switching situation for minimizing contact wear or a risk of restriking in the circuit breaker.

12. The method as claimed in claim 11, wherein the power that flows through the line, which is interruptible by the circuit breaker, is dependent on the operating state of the power distribution network and can change direction quickly.

13. The method as claimed in claim 12,
   wherein the control device detects all possible switching situations and initiates the mains-synchronous switching of the circuit breaker associated with the respective switching situation.

14. The method according to claim 12, wherein two power supply units being operated asynchronously as a result of a defect are prevented from being connected based on the voltage measurement on both sides of the circuit breaker and the comparison of the measurement values.

15. The method according to claim 12, wherein if capacitive loads are to be connected, then the circuit breaker is initiated to prevent a high inrush current.

16. The method as claimed in claim 12, wherein, when the voltage on both sides is the same, the control device identifies this and connection is carried out.

17. The method as claimed in claim 12, wherein, when there is no voltage on one side of the circuit breaker, the control device chooses the other side, where the voltage is present, as the reference value for mains-synchronous connection.

18. The method as claimed in claim 11, wherein, when the voltage on both sides is the same, the control device identifies this and connection is carried out.

19. The method as claimed in claim 11, wherein, when there is no voltage on one side of the circuit breaker, the control device chooses the other side, where the voltage is present, as the reference value for mains-synchronous connection.

20. The method as claimed in claim 19, wherein the circuit breaker is initiated by the control device such that contact is made in such a way that no switching-on overvoltages, or only small switching-on overvoltages or inrush overcurrents, occur.

21. The method as claimed in claim 11,
   wherein the control device detects all possible switching situations and initiates the mains-synchronous switching of the circuit breaker associated with the respective switching situation.

22. The method according to claim 11, wherein two power supply units being operated asynchronously as a result of a defect are prevented from being connected based on the voltage measurement on both sides of the circuit breaker and the comparison of the measurement values.

23. The method according to claim 11, wherein if capacitive loads are to be connected, then the circuit breaker is initiated to prevent a high inrush current.

24. The method as claimed in claim 11, wherein data relating to the present state of the circuit breaker, that affect the timing of the circuit breaker and are dependent on operation or erosion-dependent changes to the contact separation, are also detected by sensors and are taken into account in an appropriate manner by the control device.

25. An apparatus for mains-synchronous disconnecting of a circuit breaker, having a current transformer and having a voltage transformer on a first side of a circuit breaker,
   wherein a further voltage transformer is provided on a second side of the circuit breaker,
   wherein connections to a control device exist for reception of measurement signals from the current transformer and from the two voltage transformers,
   wherein the control device has a memory with data which is characteristic of all possible switching situations, which data is used to decide which voltage measurement signal is used as a reference value for the mains-synchronous tripping of the circuit breaker,
   wherein the control device has means for generating a switching command which initiates the mains-synchronous switching of the circuit breaker such that a timing characteristic of its tripping is controllably varied based on a detected switching situation for improved mains-synchronous switching, and
   wherein when lines on which there is no load are being disconnected, this switching situation is detected by the control device and the circuit breaker is tripped such that no premature disconnection of small inductive currents occurs.

26. The apparatus according to claim 25, comprising sensors to detect alterations to the present operating state of the circuit breaker that affect the timing of the circuit breaker and are dependent on operation or erosion-dependent changes to a contact separation, the sensors relaying data relating to the present operating state of the circuit breaker to the control device.

27. The apparatus according to claim 25, wherein mains-synchronous switching of the circuit breaker is ensured even during normal operation for either flow direction through the circuit breaker.

* * * * *